(12) United States Patent
Tominaga et al.

(10) Patent No.: US 6,319,582 B1
(45) Date of Patent: Nov. 20, 2001

(54) OPTICAL RECORDING MEDIUM

(75) Inventors: Junji Tominaga; Nobufumi Atoda, both of Tsukuba (JP)

(73) Assignee: Japan as represented by Secretary of Agency of Industrial Science and Technology, Tokyo-to (JP)

(*) Notice: Subject to any disclaimer, the term of this patent is extended or adjusted under 35 U.S.C. 154(b) by 0 days.

(21) Appl. No.: 09/506,322

(22) Filed: Feb. 18, 2000

(30) Foreign Application Priority Data

Feb. 23, 1999 (JP) .................................................. 11-044081

(51) Int. Cl.[7] ...................................................... B32B 3/02
(52) U.S. Cl. ...................... 428/64.1; 428/64.5; 428/64.6; 428/913; 430/270.13; 430/945; 369/283; 369/288
(58) Field of Search .................................. 428/64.1, 64.2, 428/64.4, 64.5, 64.6, 913; 430/270.13, 495.1, 945; 369/283, 288

(56) References Cited

U.S. PATENT DOCUMENTS

| | | | |
|---|---|---|---|
| 6,203,877 | * | 3/2001 | Okubo ................................. 428/64.1 |
| 6,226,258 | * | 5/2001 | Tominaga ............................. 369/283 |
| 6,242,157 | * | 2/2001 | Tominaga ........................ 430/270.13 |

OTHER PUBLICATIONS

Proceedings of the 9th Symposium on Phase-Change Recording, pp. 94–98 (1997).
Japanese Journal of Applied Physics, vol. 35, pp. 443–447 (1996).
Japanese Journal of Applied Physics, vol. 36, pp. 523–525 (1997).

* cited by examiner

Primary Examiner—Elizabeth Evans
(74) Attorney, Agent, or Firm—Wenderoth, Lind & Ponack, LLP

(57) ABSTRACT

Disclosed is an optical recording layer in which the microaperture for reproducing optical near-field light is controllable so as to read out the optical near-field signals with stability by keeping the signal-reproducing head at a height safe from crashing with the recording medium even when the recording marks are smaller than 100 nm. The optical recording medium is a layered body comprising: (a) a transparent substrate; (b) a first protective layer formed on the substrate; (c) an optically or thermally active layer, which is capable of reversibly generating a micro-aperture by application of light or heat, formed on the first protective layer; (d) a second protective layer, which is under a compressive stress of 200 MPa to 1 GPa, formed on the active layer; (e) an optical recording layer formed on the second protective layer; and (f) a third protective layer formed on the optical recording layer.

12 Claims, 1 Drawing Sheet

OPTICAL RECORDING MEDIUM

BACKGROUND OF THE INVENTION

The present invention relates to a novel optical recording medium from which extremely small recorded marks and pits having a size not exceeding 100 nm can be read out with stability to overcome the limitation in the prior art optical recording media for reading-out or reproduction of recorded signals.

As is well known, optical recording media are playing a leading role in the information-processing technology as a signal-recording means in the highly information-leading society in recent years in respect of the advantages that the optical recording medium is suitable for recording and reproduction of signals in an extremely high density and at a high speed.

Several classes of optical recording media of, in particular, the rewritable type have been developed and employed in the prior art including the magneto-optical recording media utilizing the interaction of light and magnetism called the Kerr effect or Faraday effect, and the phase change recording media utilizing the difference in an optical property, such as refractive index, transmissivity and reflectivity, caused by light between the amorphous phase and crystalline phase in a specific alloy composed of chalcogen elements.

On the other hand, optical recording media as a class of the write-once type utilizes the difference in the optical properties in the recording layer containing an organic dye which is susceptible to irreversible discoloration as a result of decomposition caused by heat in the areas irradiated with light.

In order to comply with the rapid progress of the highly information-leading society, in which further advancement is required for higher recording densities and higher velocity of recording and reproduction of signals in an optical recording medium, intensive investigations are now under way for the optical recording media including rewritable DVD-RAMs and write-once DVD-Rs.

Among the above mentioned various types of optical recording media, those of the phase change type are more promising for further increase of the recording density as a consequence of the characteristics of chalcogen alloys. When used in combination with a blue laser beam as the light for recording, for example, a recording density of as high as 15 gigabytes has been accomplished on a single surface of an optical recording disk with a 12-cm diameter (Preprints in Ninth Symposium on Phase Change Recording, 1997, page 94).

Further, a proposal is made in Japanese Journal of Applied Physics, volume 35 (1996), page 443, for an optical recording medium of the phase change type by utilizing the changes in the optical properties from the amorphous state of the recording layer as deposited to the crystalline state for further increase of the recording density. According to this report, crystalline marks of 60 to 200-nm diameters can be successfully formed in the optical recording medium by utilizing recording by optical near-field light with 60 nm as the smallest limit of the size of recording marks. In addition, a large activation energy is required in the optical recording medium of this type for the formation of crystalline marks of the GeSbTe alloy by the change from the as-deposit state.

Besides, a proposal is made in Japanese Journal of Applied Physics, volume 36 (1997), page 523, for the attempt of phase change type recording by utilizing an atomic force microscope in which a difference of electric charges is produced by the Schottky contact between the recording layer and the chromium-coated head of the atomic force microscope to accomplish recording of a recording mark of about 10-nm diameter. As a natural consequence of the use of the head in the atomic force microscope, this method as such is not suitable for reproduction of the recorded signals.

When high-density recording is carried out by using a near-field light or an atomic force, in particular, reproduction of recorded signals by these methods so far developed is demonstrated only under microscopes so that the reproduction of signals can never be accomplished at a high data transfer rate. This is because optical near-field intensity exponentially decreases with a propagation distance. This field cannot propagate to more than 100 nm. Therefore, the recording medium cannot be rotated to get an actual data-transfer rate of CD or DVD, otherwise the head soon makes crashes to the medium surface. This problem is held also in the use of an atomic force microscope. Namely, it is an extremely difficult matter to control such a short distance between the recording medium and the recording head under high-speed movement in a nanometer-order accuracy.

SUMMARY OF THE INVENTION

The present invention accordingly has an object, in view of the above described problems and disadvantages in the prior art, to provide an improved optical recording medium from which microscopic recording marks of 100 nm or smaller in size can be read out at a high speed and with stability even by keeping the signal-reproducing head at a height to be free from the risk of coming into contact with the recording medium so as to take out the optical near-field signals with stability under control of the microscopic aperture diameter for reproduction of the optical near-field light.

Thus, the present invention provides an optical recording medium suitable for reproduction of optical near-field light which is a multilayered disk body comprising:

(a) a transparent substrate;

(b) a first protective layer formed on the substrate;

(c) an optically or thermally active layer, which is capable of reversibly generating a microaperture by application of light or heat, formed on the first protective layer;

(d) a second protective layer, which is under a compressive stress, formed on the active layer;

(e) an optical recording layer formed on the second protective layer; and (f) a third protective layer formed on the optical recording layer.

DETAILED DESCRIPTION OF THE PREFERRED EMBODIMENTS

Figure 1:
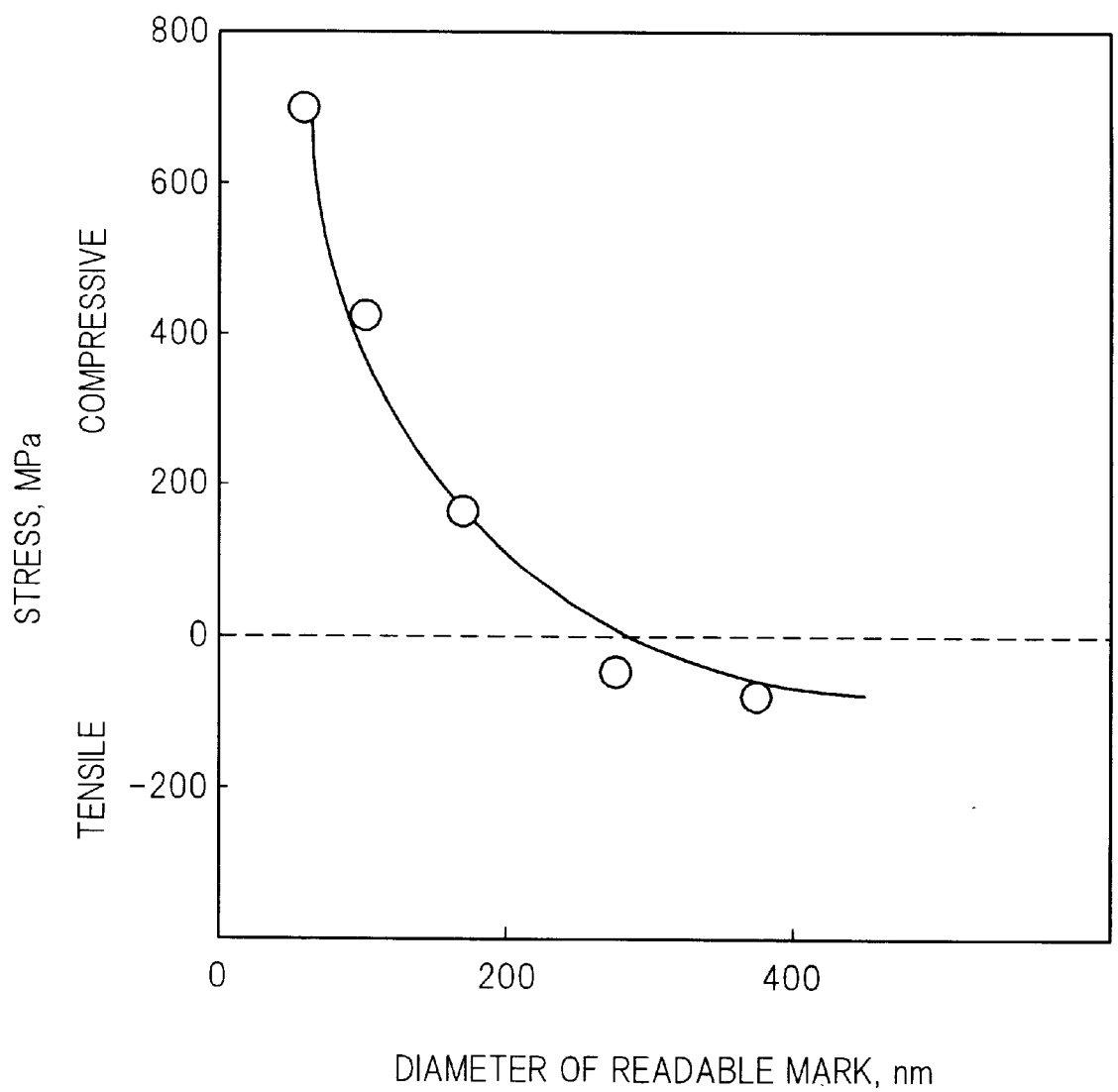
FIG. 1 is a graph showing the relationship between the stress in the second protective layer of the inventive optical recording medium and the minimum diameter of the recording marks capable of being reproduced thereby.

The material of the substrate (a) in the inventive optical recording medium is not particularly limitative provided that the material has high transparency to light and can be shaped into the form of a disk having high planarity of the surface. The transparent material can be selected from those used conventionally in optical recording media of the phase change type including, for example, various kinds of glass and polycarbonate resins without particular limitations. The thickness of the substrate depends on the types of the optical recording medium but, generally speaking, should be in the range from 0.5 to 1.5 mm. In particular, the thickness for CD and for DVD is about 1.2 mm and about 0.6 mm, respectively.

It is optional that the transparent substrate is provided on the surface with marks or pits smaller in size than the diffraction limit of the laser beams used in the optical disk drive for recording and reading-out of signals so as not to be reproduced thereby. Such micromarks can be formed by a method of utilizing electron beams or other suitable methods. Further optionally, the substrate can be provided with a guide groove for exact positioning of the laser head or with pits larger in size than the diffraction limit of the laser beams.

The optical recording medium of the invention is formed by providing, successively on the transparent substrate (a) mentioned above, (b) a first protective layer, (c) an active layer, (d) a second protective layer, (e) an optical recording layer and (f) a third protective layer to give a layered structure.

The first protective layer (b) is formed preferably from a transparent dielectric material having a melting point of 1000° C. or higher and, in particular, having a high refractive index such as silicon nitride. The first protective layer preferably has a thickness in the range from 40 to 300 nm. When the substrate is made from a plastic resin such as polycarbonate, it is optional that a thin metal layer is interposed between the substrate surface and the first protective layer as a heat-dissipating layer for protection of the plastic substrate from heat generated in the recording layer (e).

The active layer (c) formed on the above described first protective layer is an optically or thermally active layer susceptible to reversible formation of a microaperture by the application of light or heat. The material of this active layer is selected preferably from phase change materials or materials having a large third-order nonlinear effect. It is advantageous in the use of a phase change material for the active layer that the speed of optical changes therein is higher than the rewriting speed in the recording layer. Such a requirement is satisfied by antimony or an alloy of antimony with tellurium, arsenic and the like, of which the content of antimony is at least 92 atomic %. The active layer (c) has a thickness preferably in the range from 5 to 50 nm.

The active layer (c) has transmissivity to the optical near-field light scattering from the recording layer (e) to play a role as an aperture in the probe of near-field microscopes heretofore under use, when a high intensity laser beam is irradiated.

The second protective layer (d) provided on the above described active layer (c) can be formed from the same material as that for the first protective layer (b) described above and should have a thickness preferably in the range from 5 to 50 nm. The second protective layer (d) serves to transmit the optical near-field light generated in the recording layer to the active layer.

The optical recording layer (e) formed on the second protective layer is a layer capable of recording signals by irradiation with light and can be formed from a material selected from the those used in the recording layer of a conventional optical recording medium of the phase change type. Examples of suitable materials include germanium/ antimony/tellurium alloys, silver/indium/antimony/ tellurium alloys, which have a smaller crystallization energy than the germanium/antimony/tellurium alloys, and silver/ indium/antimony/tellurium/vanadium alloys which are susceptible to control of the crystallization speed to accomplish retardation of crystal growth.

The recording layer (e) of the above mentioned material can be formed on the second protective layer by a known method including physical deposition methods such as vacuum vapor deposition and sputtering and chemical vapor-deposition methods. In conducting the physical deposition methods, the target material can be one of the above mentioned alloy materials as such or can be a composite target of the respective constituent elements each in the elementary form resulting in the in situ formation of the alloy on the surface.

The optical recording layer (e) formed on the second protective layer (d) can be used in the as-deposited state or can be used after a phase change from the as-deposited state having great randomness to a crystalline state of less randomness by interacting with light or heat followed by temperature elevation up to the crystallization point of the layer or higher by irradiation with laser beams or by heating and then quenching at an ultrahigh cooling speed to regain the amorphous state. In a GeSbTe-based recording layer with the thus regained amorphousness, in particular, the activation energy is about 1.4 to 1.7 eV and the crystal transition temperature is about 150° C. Though not particularly limitative, the optical recording layer (e) has a thickness preferably in the range from 5 to 50 nm.

The uppermost layer in the inventive optical recording medium is a third protective layer (f) formed on the above described recording layer (e). The material of this third protective layer (f) can be the same one as that for the first and second protective layers. The third protective layer has a thickness preferably in the range from 5 to 100 nm. This third protective layer (f) serves to ensure stability of the active layer subjected to optical changes by light so as to increase the number of reproduction repetition of the recording medium.

The inventive optical recording medium having the above described layered structure is used for recording and reproduction of signals by using an optical near-field light in the following manner.

Thus, in recording of optical signals on the inventive optical recording medium, a first light is introduced into the medium through the transparent substrate, the first protective layer, the active layer and the second protective layer. The above mentioned first light is preferably a laser beam having a relatively short wavelength. The laser beam is focused onto the recording layer by means of an optical head conventionally employed in DVD-RAMs and the like so as to form recording marks in the recording layer. The size of the recording marks for the reproducible minimum signals is determined by the size of the focused laser beam spot. The spot diameter of a blue laser beam of 488 nm wavelength, for example, cannot be smaller than 0.6 $\mu$m because of the optical diffraction limit. When the recording layer is formed from a phase change recording material, however, the mark size depends on the melting point inherent in the recording layer so that a further smaller recording marks can be formed beyond the diffraction limit of the laser beam due to the intensity and profile thereof by adequately controlling the irradiation intensity of the laser beam. Since the size of the thus recorded microsignals is, as a matter of course, smaller than the diffraction limit of the optical head used for recording, however, the same optical head cannot be used for reproduction of the recorded signals.

Reproduction of the microsignals recorded in the above described manner can be performed in the following manner. Thus, the microsignals recorded in the recording layer are irradiated with a second light having an intensity with a lower intensity than that used for recording not to erase the recorded marks by the readout. As the intensity of this second light is increased, the light or the heat generated by the irradiation with the light gives rise to a change in the transmissivity of the active layer to the light within the region of the irradiated spot resulting in the formation of a microaperture.

By passing the microaperture thus formed in the active layer by the second light, an optical near-field light is generated and transmitted to the second protective layer. This is scattered by the pit or recording mark formed beforehand in the recording layer and having a size smaller than the diffraction limit and the reflecting light returns to a reflecting-light detector. On the other hand, the transmitting light reaches a transmitting-light detector installed at the opposite position of the incident laser beam. Further, the transmitting light involving an optical near-field light is subjected to large-angle scattering so that the signal-detecting sensitivity can be improved by conducting reproduction of signals from the optical recording medium as encased in a disk case. Namely, the sensitivity for detection of the transmitting light signals can be improved by providing an optical detector having an area sufficiently large to cover substantially the whole area of the optical recording medium on the back surface of the disk case enabling almost entire detection of the transmitting light after large-angle scattering.

In the present invention, namely, a microaperture for detection of the optical near-field light is generated in the active layer while keeping the thickness of the second protective layer unchanged because of the solid layer, and an optical near-field light can be generated so that reproduction of the recorded signals can be performed at a high speed while keeping the signal reproducing head, here, the microaperture, at such a height above the recording medium as to be safe from the risk of direct crash with the recording medium.

A determinant factor for the size of the microaperture formed in the active layer is the stress in the second protective layer provided on the active layer. When the stress acting on the second protective layer is a compressive stress, formation of the microaperture is disturbed or, even if formed, the diameter of the microaperture is decreased by a great compressive stress in the second protective layer due to an increase in the Gibbs' free energy required for the formation of the microaperture. When the stress on the second protective layer is a tensile stress, on the other hand, formation of a microaperture is promoted and, once a microaperture is formed in the active layer, the diameter of the microaperture is increased instantaneously as a consequence of the stabilized balance of stress. Thus, control of the stress on the second protective layer provides a means for obtaining a desired size of the microaperture formed in the active layer.

It is accordingly essential that the stress on the second protective layer is a compressive stress which is preferably in the range from 200 MPa to 1 GPa. Such a value of the compressive stress can be obtained by adequately controlling the vacuum pressure or other conditions in the vacuum-deposition process for the formation of the second protective layer.

FIG. 1 of the accompanying drawing is a graph showing the relationship between the stress acting on the second protective layer and the reproducible minimum diameter of the recording marks in a typical example of the inventive optical recording medium. As is understood from this graph, reproduction of a very small recording mark having a diameter not exceeding 100 nm can be accomplished with the inventive optical recording medium by adequately controlling the stress on the second protective layer.

In the following, the optical recording medium of the present invention is described in more detail by way of Examples and a Comparative Example, which, however, never limit the scope of the invention in any way.

EXAMPLE 1

A first protective layer of a silicon nitride dielectric film having a thickness of 170 nm was formed on a 0.6 mm thick transparent substrate of polycarbonate resin provided in advance with a number of pits having a diameter of 100 to 500 nm. Thereafter, an optically active layer of substantially pure antimony having a thickness of 15 nm and a second protective layer of silicon nitride having a thickness of 20 nm were successively formed thereon. This second protective layer was under a compressive stress of 700 MPa as calculated by applying the Stoney's equation from bending or deformation of the surface determined by using a surface-profile tester.

In the next place, an optical recording layer having a thickness of 15 nm was formed on the second protective layer from a GeSbTe alloy by the vacuum film-deposition method followed by formation of a third protective layer of silicon nitride having a thickness of 20 nm on top of the recording layer thus to complete an optical recording disk.

The thus prepared recording disk was kept rotating at a linear velocity of 6 m/second and irradiated with light of 680 nm wavelength through the transparent substrate at a numerical lens aperture of 0.6. No signals could be detected in each of the optical detector installed at the reflection side and the detector installed at the transmission side until the power of the incident light was 3.5 mW. When the power of the incident light was increased to 3.8 mW, however, signals could be detected in the reflection-side detector with a sensitivity of the C/N value of 25 dB for the recording marks of 100 nm.

Comparative Example

A first protective layer of a $ZnS$—$SiO_2$ dielectric film having a refractive index of 2.2 approximately identical to that of silicon nitride was formed in a thickness of 170 nm on a 0.6 mm thick transparent substrate of polycarbonate resin provided in advance with a number of pits having a diameter of 100 to 500 nm. Thereafter, an optically active layer of substantially pure antimony having a thickness of 15 nm and a second protective layer of $ZnS$—$SiO_2$ having a thickness of 20 nm were successively formed thereon. This second protective layer was under a tensile stress of 50 MPa as calculated by applying the Stoney's equation from bending or deformation of the surface determined by using a surface-profile tester.

In the next place, an optical recording layer having a thickness of 15 nm was formed on the second protective layer from a GeSbTe alloy by the vacuum film-deposition method followed by formation of a third protective layer of $ZnS$-$SiO_2$ having a thickness of 20 nm on top of the recording layer thus to complete an optical recording disk.

The thus prepared recording disk was kept rotating at a linear velocity of 6 m/second and irradiated with light of 680 nm wavelength through the transparent substrate at a numerical lens aperture of 0.6. No signals could be detected in each of the optical detector installed at the reflection side and the detector installed at the transmission side until the power of the incident light was 3.5 mW. Recording marks of 100 nm could not be detected even when the power of the incident light was increased to 5.0 mW and the minimum diameter of the recording marks capable of being read out was estimated to be 300 nm.

EXAMPLE 2

An optical recording disk having substantially the same layered structure as in Example 1 was prepared excepting for the omission of the pits formed in advance on the transparent substrate. Signals of 30 MHz frequency were recorded on the recording layer by irradiating through the transparent substrate with a first light beam of 7.0 mW power to give recorded marks of 100 nm size.

Reproduction of the recorded signals failed by tracing the same track as in recording by a second light beam of 3.5 mW intensity without detectable signals in each of the detectors at the reflection side and on the transmission side. When the intensity of the second light was increased up to 3.8 mW, however, signals could be detected in each of the detectors with a sensitivity of the C/N value of 27 dB for the recording marks.

What is claimed is:

1. An optical recording medium suitable for reproduction of optical near-field light which is a successively layered integral disk body comprising:
   (a) a transparent substrate;
   (b) a first protective layer formed on the substrate;
   (c) an optically or thermally active layer, which is capable of reversibly generating a microaperture by application of light or heat, formed on the first protective layer;
   (d) a second protective layer, which is under a compressive stress, formed on the active layer;
   (e) an optical recording layer formed on the second protective layer; and
   (f) a third protective layer formed on the optical recording layer.

2. The optical recording medium as claimed in claim 1 in which the transparent substrate is made from glass or a polycarbonate resin.

3. The optical recording medium as claimed in claim 1 in which the first, second and third protective layers are each formed from a transparent material having a melting point not lower than 1000° C.

4. The optical recording medium as claimed in claim 3 in which the transparent material forming the first, second and third protective layers is silicon nitride.

5. The optical recording medium as claimed in claim 1 in which the first protective layer has a thickness in the range from 40 to 300 nm.

6. The optical recording medium as claimed in claim 1 in which the optically or thermally active layer is formed from antimony or an alloy containing at least 92 atomic % of antimony.

7. The optical recording medium as claimed in claim 1 in which the optically or thermally active layer has a thickness in the range from 5 to 50 nm.

8. The optical recording medium as claimed in claim 1 in which the second protective layer has a thickness in the range from 5 to 50 nm.

9. The optical recording medium as claimed in claim 1 in which the compressive stress on the second protective layer is in the range from 200 MPa to 1 GPa.

10. The optical recording medium as claimed in claim 1 in which the optical recording layer is formed from a Ge/Sb/Te alloy, a Ag/In/Sb/Te alloy or a Ag/In/Sb/Te/V alloy.

11. The optical recording medium as claimed in claim 1 in which the optical recording layer has a thickness in the range from 5 to 50 nm.

12. The optical recording medium as claimed in claim 1 in which the third protective layer has a thickness in the range from 5 to 100 nm.

* * * * *